Dec. 30, 1952 C. C. MILLER, JR., ET AL 2,623,597
ROTARY WING AIRCRAFT WITH PLURAL ROTORS
Filed June 19, 1947 4 Sheets-Sheet 3

INVENTOR.
CHARLES C. MILLER JR.
GEORGE C. ABBE
By Edward G. Vanderlip
Agent

Dec. 30, 1952     C. C. MILLER, JR., ET AL     2,623,597
ROTARY WING AIRCRAFT WITH PLURAL ROTORS
Filed June 19, 1947     4 Sheets-Sheet 4
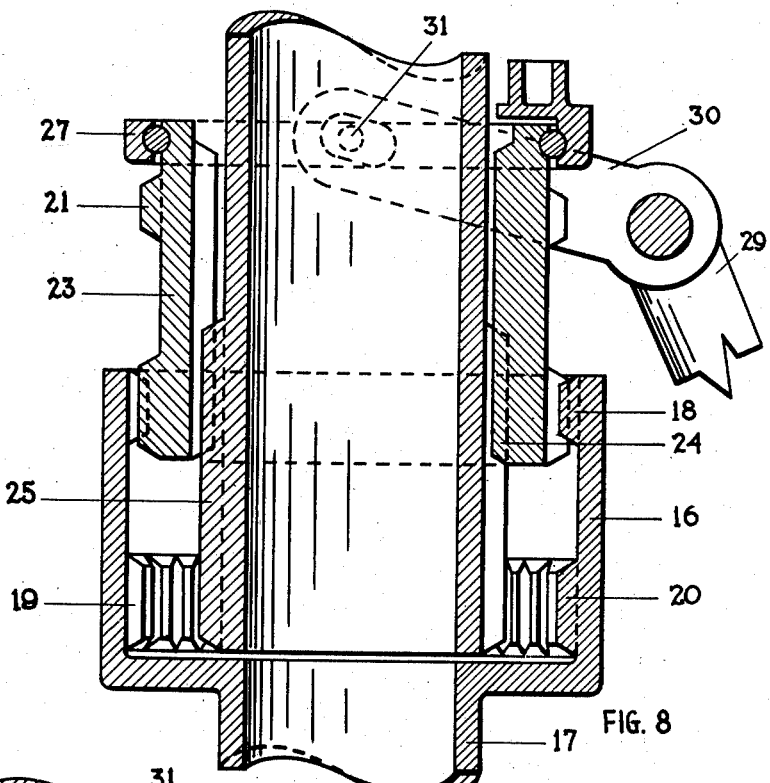
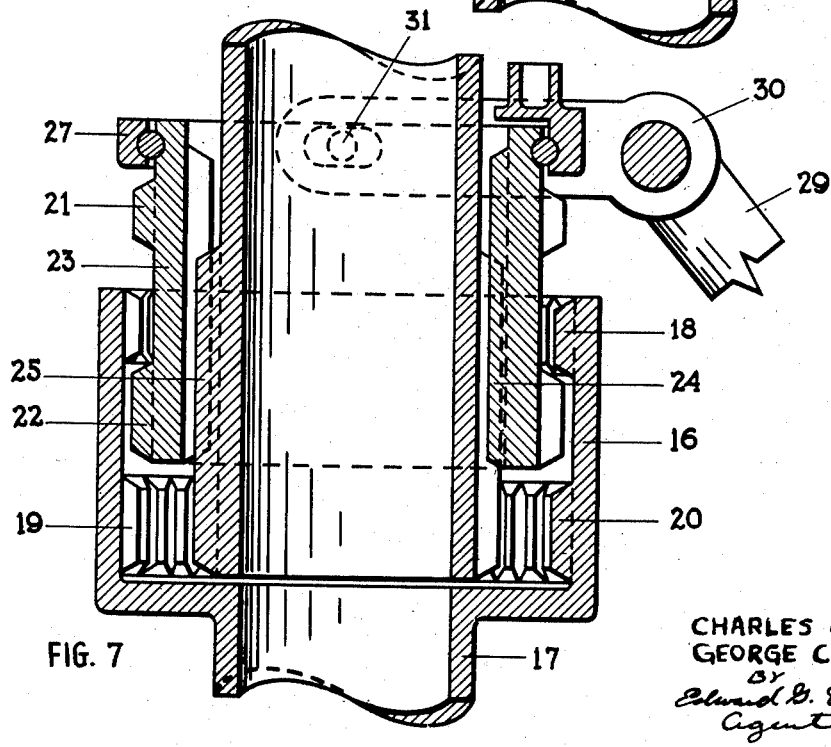
INVENTOR.
CHARLES C. MILLER JR.
GEORGE C. ABBE
BY
Edward G. Vanderlip
Agent

Patented Dec. 30, 1952

2,623,597

UNITED STATES PATENT OFFICE 2,623,597

ROTARY WING AIRCRAFT WITH PLURAL ROTORS

Charles C. Miller, Jr., Springfield, and George C. Abbe, Swarthmore, Pa., assignors, by mesne assignments, to Piasecki Helicopter Corporation, Morton, Pa., a corporation of Pennsylvania Application June 19, 1947, Serial No. 755,620

4 Claims. (Cl. 170—135.2)

This invention relates to rotary wing aircraft and more particularly to aircraft having a plurality of rotors.

We have found that in the use of rotary wing aircraft wherein the several rotors are normally driven in intermeshing relationship, that it is sometimes desirable to have a means to change the phase relationship of the rotors to each other for storage purposes or when servicing the machine.

The principal object of this invention is therefore to provide a means for temporarily disconnecting the driving connections between the intermeshing rotors by means of a selectively shiftable control member.

Another object of this invention is to provide a means which will allow relative movement between the rotors of a multiple rotor helicopter, said means also including mechanism for locking the rotors in any out-of-phase position desired.

A further object of this invention is to provide a rotary wing aircraft, having several intermeshing rotors in driving engagement with each other to prevent blade interference of the several rotors, with a de-clutching means associated with said driving means to allow the rotors to be turned manually independently of each other.

These objects are attained by the mechanism shown in the accompanying drawings forming a part of this specification in which:

Figure 1 is a helicopter shown in plan view.

Figure 2 the same helicopter is shown in plan view with its rotor blades in folded position.

Figure 7 is a cross-sectional view similar to Figure 4 but with the elements arranged in a second position.

Figure 8 is a cross-sectional view similar to Figure 4 showing the elements in a third position.

Figure 1:
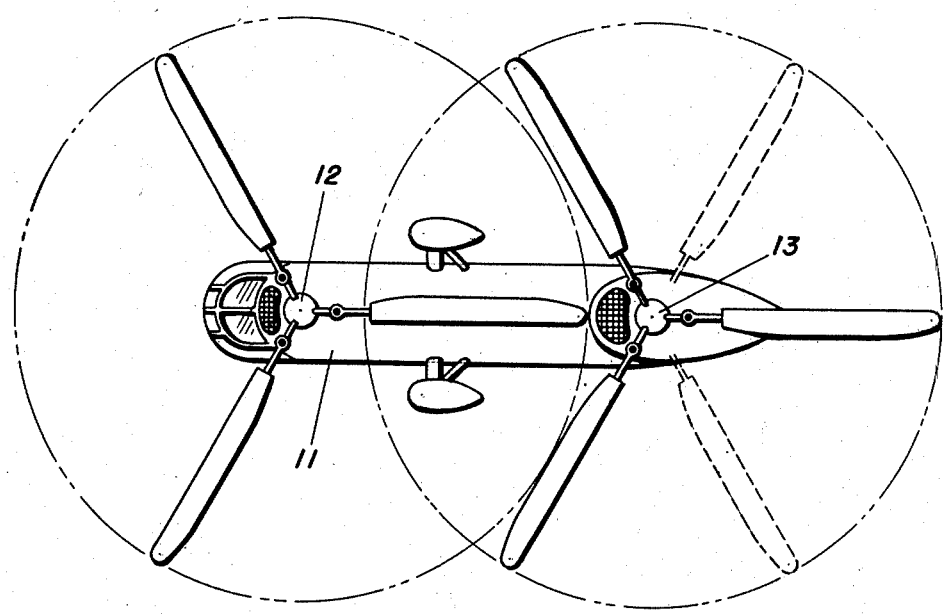

Referring more particularly to the drawings it will be noted that in Figure 1 there is shown a helicopter comprised of a fuselage 11 having mounted thereon rotors 12 and 13. Rotors 12 and 13 are driven by a common power plant 14 through a drive system shown in broken lines in Figure 3. This drive system can be any one of several well known drive systems wherein the rotors are maintained in the phase relationship shown in Figure 1 in full lines. This phase relationship must be maintained when the rotors are power driven to prevent the blades of the several rotors from colliding with each other under certain flapping or coning conditions. The drive system also includes a clutch not shown, for disconnecting the power plant from the rotors, the clutch being located adjacent to the power plant so that the driving connection between the rotors is not interrupted.

Figure 2:
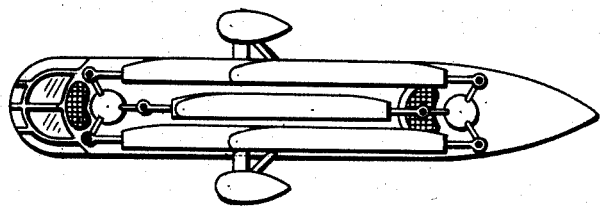
Figure 3:
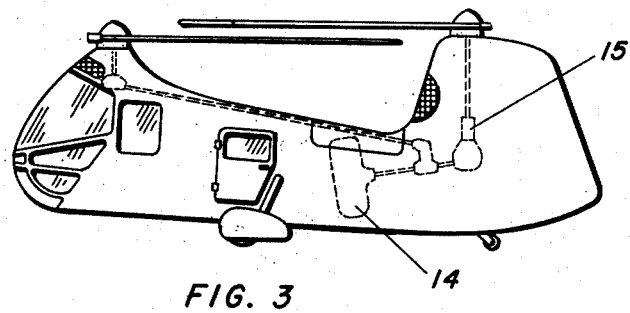
Figure 3 is a side elevational view of a helicopter provided in our invention in which the blades are shown in folded position.

Referring to Figure 2 of the drawings it will be noted that in order to fold the blades as shown in this figure, it is necessary that the phase relationship of the two rotors be changed so that they are in an overlapping relationship. To accomplish this it is necessary to provide a declutching arrangement in the drive system between the two rotors so that either of the rotors may be turned independently of each other to a position shown in Figure 2, also that the rear rotor may be turned independently of the front rotor to the position shown in broken lines in Figure 1. This de-clutching device will hereinafter be referred to as a dephasing unit and is preferably incorporated as part of the rear transmission 15 as shown in Figure 3 of the drawings. However, this unit could be placed anywhere in the drive system connecting the two rotors together.

Figure 4:
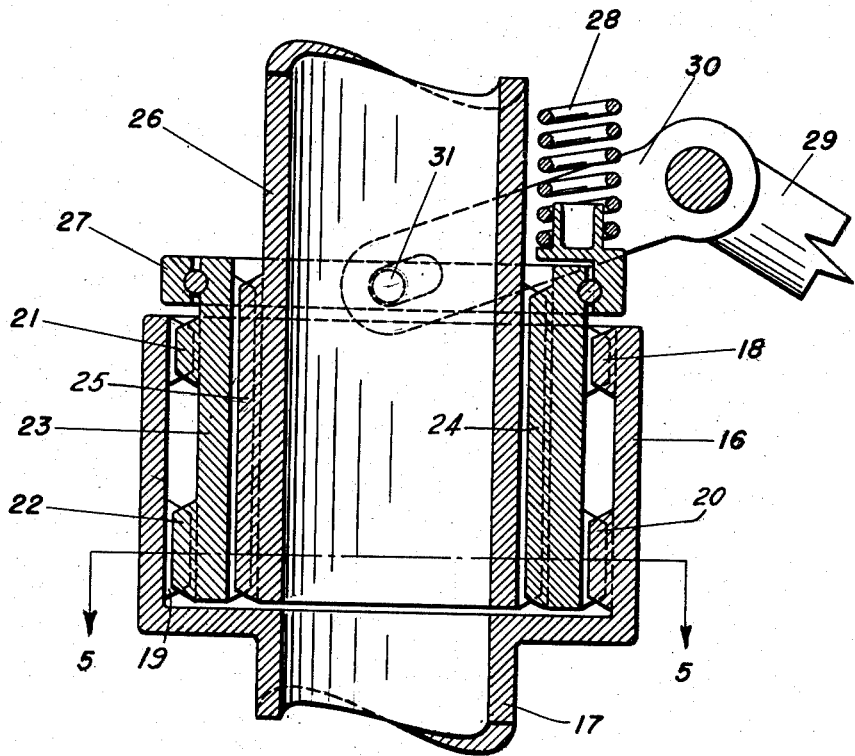
Figure 4 is a cross section view of the dephasing unit.
Figure 5:
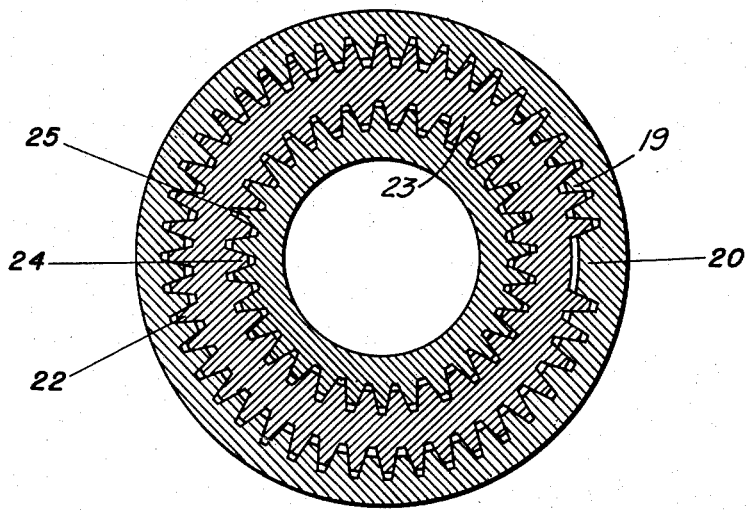
Figure 5 is a cross section view of the dephasing unit shown in Figure 4, the cross section being taken on line 5—5 of Figure 4.
Figure 6:
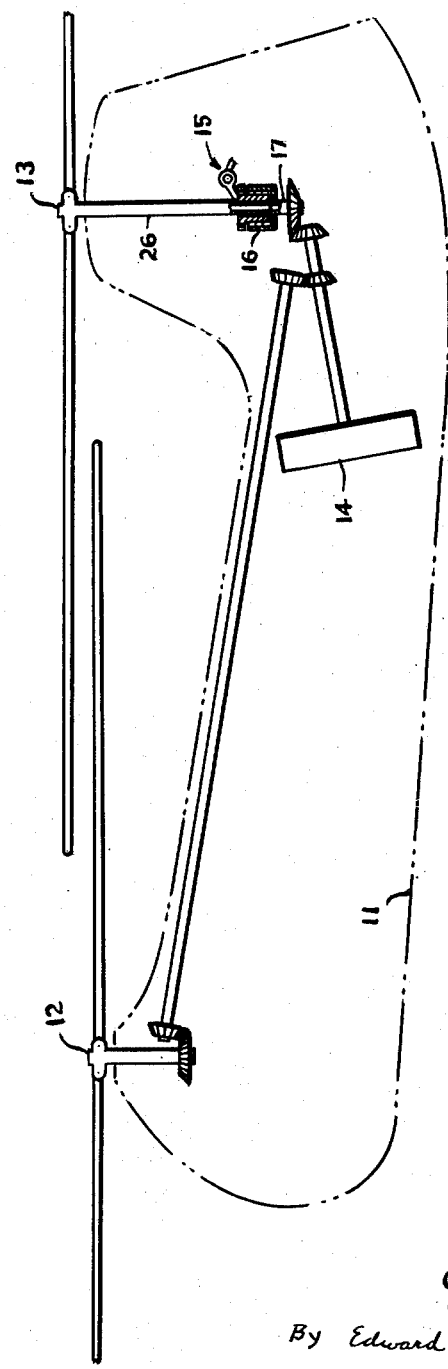
Figure 6 is a side elevation showing a drive system in combination with the helicopter rotors.

The dephasing unit is shown in detail in Figures 4 and 5 and is comprised of a member 16 fixed to the drive shaft 17. The member 16 is provided with two rows of internal gear teeth or splines 18 and 19. The lower row 19 is provided with one tooth 20 which is larger than the others. The teeth or splines of the member 16 are in driving engagement with the two rows of external teeth 21 and 22 formed on a sleeve 23. The selectively shiftable control member constitutes a sleeve 23 which is also provided with internal splines 24 formed thereon, said splines 24 of the sleeve 23 being in engagement with external splines 25 formed on the drive shaft 26. One tooth is omitted from the externally formed gear 22 to prevent mating of the teeth 19 and 22 except when the two gears are in position where the large tooth 20 is in alignment with the slot formed by the missing tooth in the row of teeth 22.

This arrangement prevents driving engagement between the rotors 12 and 13 when the rotors are out-of-phase with each other it being understood of course, that the rotors are fixed to the rotor shafts in the phase relationship shown in Figure 1 when the teeth 19 and 22 are engaged.

The sleeve 23 is adapted to be moved longitudinally relative to the shaft 26 and the member 16 to a position where the teeth 21 and 22 are disengaged from the teeth 18 and 19. When the sleeve 23 is in such a position either one of the rotors may then be manually turned independently of the other. When the desired out-of-phase position between the rotors is obtained the sleeve 23 is moved upward until the teeth 22 of the sleeve are in engagement with the upper row of teeth 18 formed on the member 16, this position locking the two rotors in an out-of-phase relationship.

Before the rotors can be brought back to a correct phase relationship for powered flight it is necessary to move the sleeve downwardly to its intermediate position wherein the rotors may be rotated until they are in correct phase relationship at which point the slot formed by the missing tooth on the lower gear 22 will be in alignment with the larger tooth formed on the lower gear 19 at which point the sleeve 23 is lowered to lock the rotors in correct phase relationship for driving.

The various parts are maintained in driving relationship by a spring 28 which acts to hold the sleeve 23 in its lower position. The spring 28 bears on the outer stationary race of the bearing 27. The sleeve 23 can be moved into any one of its several positions by any suitable mechanism. The one shown is comprised of a bell crank 29 provided with a yoke portion 30 engaging pins 31 formed on the outer race of bearing 27. The bell crank 29 can be operated by the pilot if desired through manipulation of suitable linkage leading up to the pilot's compartment.

It can be readily understood that various changes and modifications could be made in this device without departing from the spirit and scope of this invention as defined in the appended claims.

We claim:

1. A helicopter having lift rotors arranged to be driven in a predetermined in phase relationship, shaft means connected to each of said rotors, drive means connected to said shaft means and interconnecting said rotors, one of said shaft means having a first and second shaft element, the first shaft element having a single engaging means, the second shaft element having first and second engaging means, movable means carried by said first shaft element and in sliding engagement with said single engaging means, said movable means being provided with first and second engaging means, control means movable to several positions, said control means being operatively connected to said movable means, one position of said control means positioning the first and second engaging means provided on the movable means in respective engagement with the first and second engaging means provided on said second shaft element, a second position of said control means positioning said movable means so that no engagement of said first and second engaging means provided on said movable means and said second shaft element exists, the third position of said control means positioning said movable means to provide an engagement of said first engagement means provided on said movable means with said second engagement means provided on said second shaft element, each of said first engaging means provided on said movable means and said second shaft element being formed to engage only in a predetermined relationship.

2. A helicopter having lift rotors arranged to be driven in a predetermined in phase relationship, a drive system interconnecting said rotors and transmitting torque to and from said rotors, drive means connected to said drive system, said drive system including means to connect said rotors in an in-phase driving relationship and in an out of phase non-driving relationship and to disconnect said rotors to permit individual manual rotaton of said rotors, said means comprising, a shaft element having a driving engaging element and a non-driving engaging element, a second shaft element having a shiftable engaging element mounted thereon for rotation therewith, control means movable to three positions operatively connected to said shiftable means, one position of said control means providing an engagement of said shiftable engaging element with said driving engaging element, a second position of said control means disengaging said engaging elements and a third position of said control means providing an engagement of said non-driving engaging element with said shiftable engaging element.

3. A helicopter having lift rotors arranged to be driven in a predetermined in-phase relationship, shaft means connected to each of said rotors, drive means connected to said shaft means, one of said shaft means including first and second shafts, a shiftable engaging member mounted on said first shaft for rotation therewith, control means operatively connected to said shiftable engaging member, a driving engaging element fixedly mounted on said second shaft, one position of said control means positioning the shiftable engaging member in engagement with the driving engaging element, said shiftable engaging member and said driving engaging element being formed to engage only in a predetermined in-phase rotor driving relationship.

4. A helicopter having lift rotors arranged to be driven in a predetermined in-phase relationship, shaft means connected to each of said rotors, drive means connected to said shaft means, one of said shaft means including first and second shafts, a shiftable engaging member mounted on said first shaft for rotation therewith, control means operatively connected to said shiftable engaging member, a driving engaging element fixedly mounted on said second shaft, one position of said control means positioning the shiftable engaging member in engagement with the driving engaging element, a second position of said control means positioning said shiftable engaging member so that no engagement of said shiftable engaging member with the driving engaging element exists, said shiftable engaging member and said driving engaging element being formed to engage only in a predetermined in-phase rotor driving relationship.

CHARLES C. MILLER, Jr.
GEORGE C. ABBE.

REFERENCES CITED

The following references are of record in the file of this patent:

UNITED STATES PATENTS

| Number | Name | Date |
|---|---|---|
| Re. 15,542 | Thiell | Feb. 13, 1923 |
| 1,360,864 | Archer et al. | Nov. 30, 1920 |
| 1,913,046 | Callan | June 6, 1933 |
| 2,068,774 | Smith | Jan. 26, 1937 |
| 2,111,988 | Percival | Mar. 22, 1938 |
| 2,385,464 | Peterson | Sept. 25, 1945 |